（12) United States Patent
Oduoroggorremassin (10) Patent No.: US 11,250,727 B1
(45) Date of Patent: Feb. 15, 2022

(54) CANNULATION TRAINING APPARATUS

(71) Applicant: Daniel Oduoroggorremassin, Indianapolis, IN (US)

(72) Inventor: Daniel Oduoroggorremassin, Indianapolis, IN (US)

( * ) Notice: Subject to any disclaimer, the term of this patent is extended or adjusted under 35 U.S.C. 154(b) by 401 days.

(21) Appl. No.: 16/385,067

(22) Filed: Apr. 16, 2019

(51) Int. Cl.
*G09B 23/30* (2006.01)
*G09B 23/28* (2006.01)

(52) U.S. Cl.
CPC ......... *G09B 23/285* (2013.01); *G09B 23/303* (2013.01)

(58) Field of Classification Search
CPC ....... G09B 23/28; G09B 23/30; G09B 23/303
See application file for complete search history.

(56) References Cited

U.S. PATENT DOCUMENTS

| | | | |
|---|---|---|---|
| 2,871,584 A | 2/1959 | Poole | |
| 2,995,832 A | 8/1961 | Alderson | |
| 3,789,518 A | 2/1974 | Chase | |
| 4,182,054 A * | 1/1980 | Wise | G09B 23/285 434/268 |
| 5,215,469 A * | 6/1993 | Kohnke | G09B 23/285 434/268 |
| 5,839,904 A | 11/1998 | Bloom | |
| 7,306,465 B2 * | 12/2007 | White | G09B 23/285 434/268 |
| 7,316,568 B2 * | 1/2008 | Gordon | G09B 23/28 434/262 |
| 7,510,398 B1 * | 3/2009 | Thornton | G09B 23/288 434/262 |
| 8,460,003 B2 * | 6/2013 | Bevan | G09B 23/28 434/262 |
| 8,690,580 B2 | 4/2014 | Paronen | |
| 10,706,742 B2 * | 7/2020 | Stump | G09B 5/00 |
| 10,736,698 B2 * | 8/2020 | Bohl | B29C 64/393 |
| 2007/0148633 A1 * | 6/2007 | Sakezles | G09B 23/28 435/4 |
| 2009/0148822 A1 * | 6/2009 | Eggert | G16H 50/50 434/271 |
| 2016/0027345 A1 * | 1/2016 | Carson | G09B 23/30 434/262 |
| 2019/0027064 A1 * | 1/2019 | Nelson | G09B 23/303 |
| 2019/0027066 A1 * | 1/2019 | Altermatt Couratier | G09B 23/303 |

FOREIGN PATENT DOCUMENTS

WO 2010046535 4/2010

* cited by examiner

*Primary Examiner* — Kurt Fernstrom
(74) *Attorney, Agent, or Firm* — Kyle A. Fletcher, Esq.

(57) ABSTRACT

The cannulation training apparatus is a medical device. The cannulation training apparatus is configured for use in training a client to insert a cannula into the vein of a patient. The cannulation training apparatus simulates the arm of a patient such that the cannulation training apparatus receives the insertion of the cannula from the client. The cannulation training apparatus comprises a silicone housing, a fluidic circuit, and a timing device. The silicone housing contains the fluidic circuit and the timing device. The silicone housing emulates an appendage of the patient. The fluidic circuit emulates the flow of blood through the appendage of the patient. The timing device controls the operation of a pump that pumps fluid through the fluidic circuit in a rhythmic fashion that emulates the pulse of a patient.

19 Claims, 5 Drawing Sheets

CANNULATION TRAINING APPARATUS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physics including education and educational appliances, more specifically, a model for medical training purposes. (G09B23/285)

SUMMARY OF INVENTION

The cannulation training apparatus is a medical device. The cannulation training apparatus is configured for use in training a client to insert a cannula into the vein of a patient. The cannulation training apparatus simulates the arm of a patient such that the cannulation training apparatus receives the insertion of the cannula from the client. The cannulation training apparatus comprises a silicone housing, a fluidic circuit, and a timing device. The silicone housing contains the fluidic circuit and the timing device. The silicone housing emulates an appendage of the patient. The fluidic circuit emulates the flow of blood through the appendage of the patient. The timing device controls the operation of a pump that pumps fluid through the fluidic circuit in a rhythmic fashion that emulates the pulse of a patient.

These together with additional objects, features and advantages of the cannulation training apparatus will be readily apparent to those of ordinary skill in the art upon reading the following detailed description of the presently preferred, but nonetheless illustrative, embodiments when taken in conjunction with the accompanying drawings.

In this respect, before explaining the current embodiments of the cannulation training apparatus in detail, it is to be understood that the cannulation training apparatus is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cannulation training apparatus.

It is therefore important that the claims be regarded as including such equivalent construction insofar as they do not depart from the spirit and scope of the cannulation training apparatus. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The cannulation training apparatus is a medical device. The cannulation training apparatus is configured for use in training a client to insert a cannula into the vein of a patient. The cannulation training apparatus simulates the arm of a patient such that the cannulation training apparatus receives the insertion of the cannula from the client. The cannulation training apparatus comprises a silicone housing, a fluidic circuit, and a timing device. The silicone housing contains the fluidic circuit and the timing device. The silicone housing emulates an appendage of the patient. The fluidic circuit emulates the flow of blood through the appendage of the patient. The timing device controls the operation of a pump that pumps fluid through the fluidic circuit in a rhythmic fashion that emulates the pulse of a patient.

Figure 1:
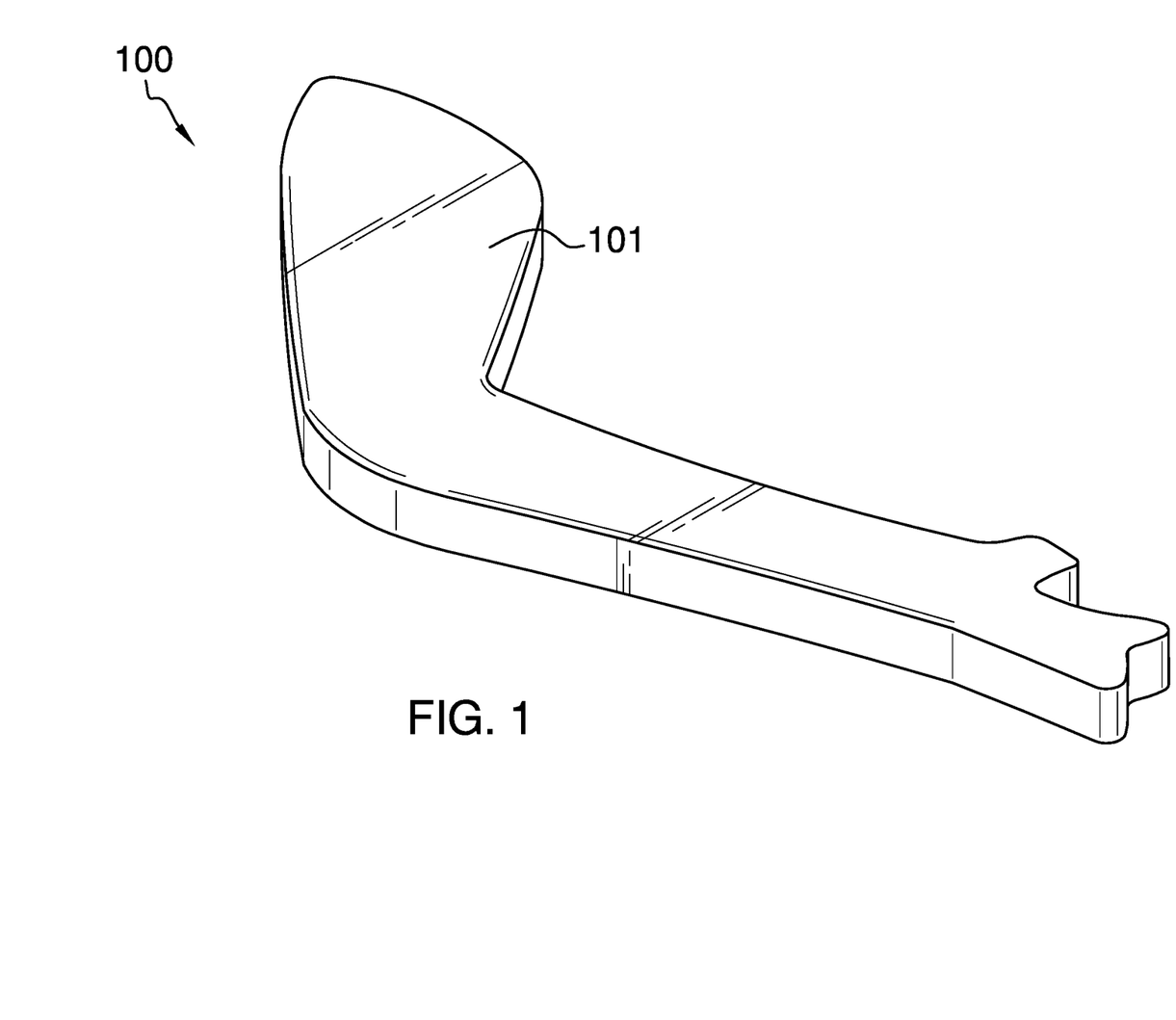
FIG. 1 is a perspective view of an embodiment of the disclosure.
Figure 2:
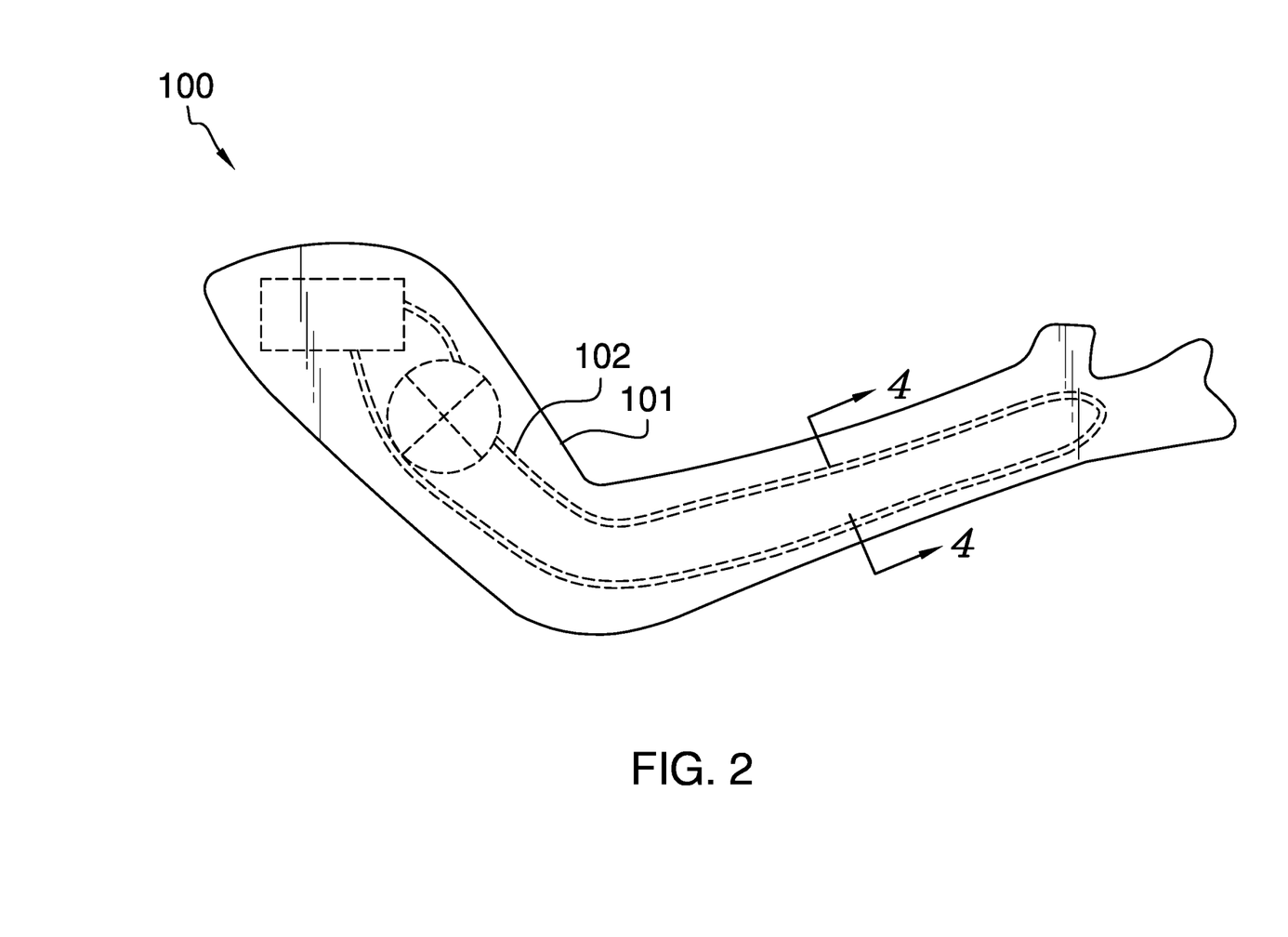
FIG. 2 is a top view of an embodiment of the disclosure.
Figure 3:
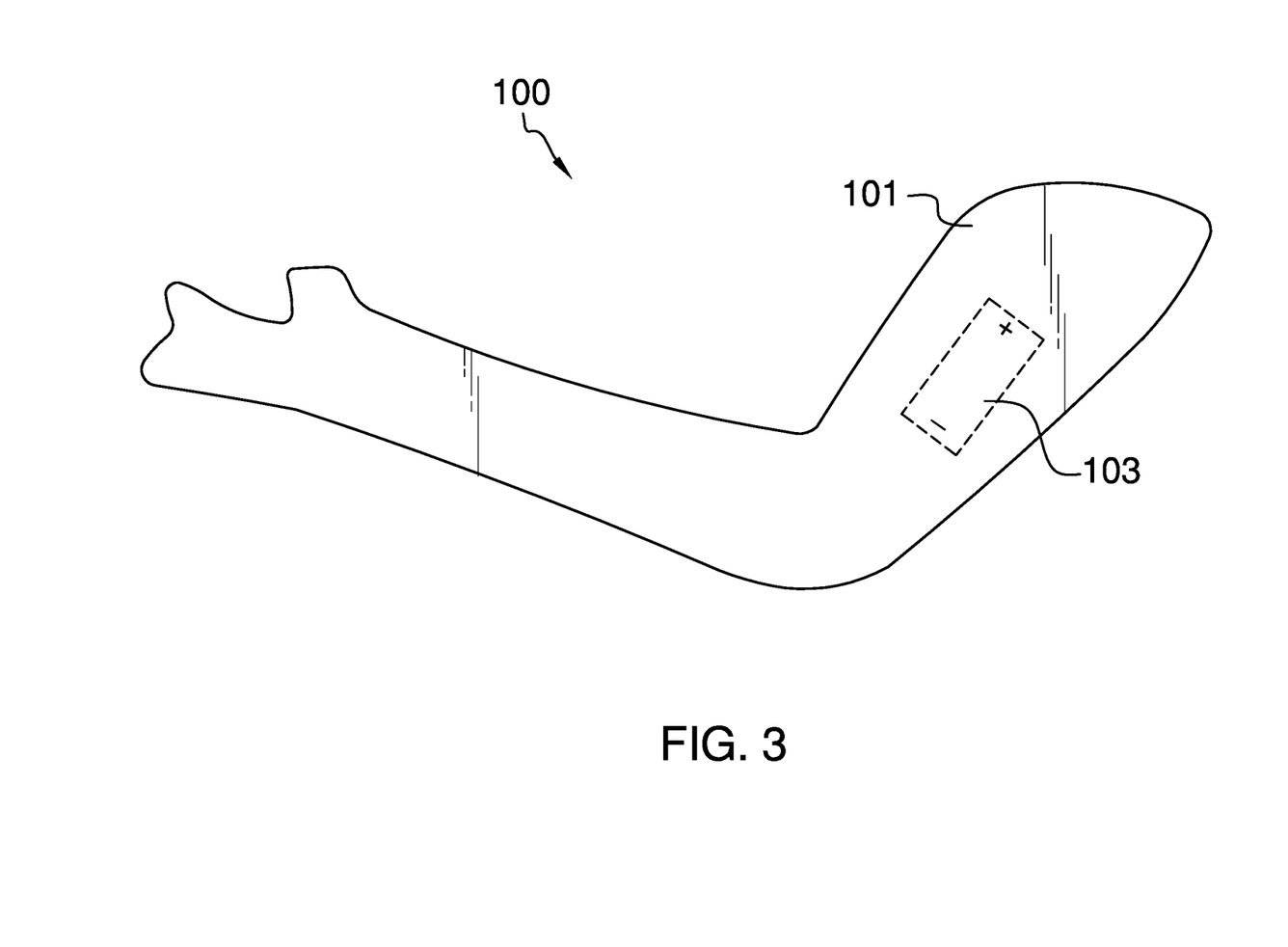
FIG. 3 is a bottom view of an embodiment of the disclosure.
Figure 4:
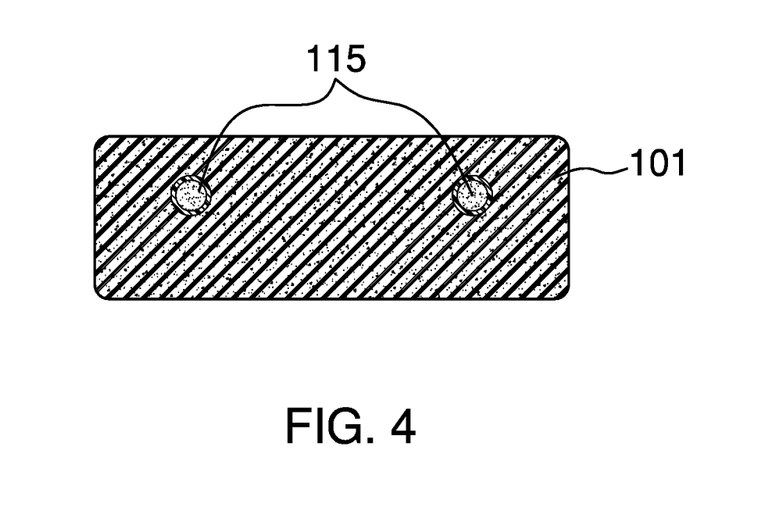
FIG. 4 is a cross-sectional view of an embodiment of the disclosure across 4-4 as shown in FIG. 2.
Figure 5:
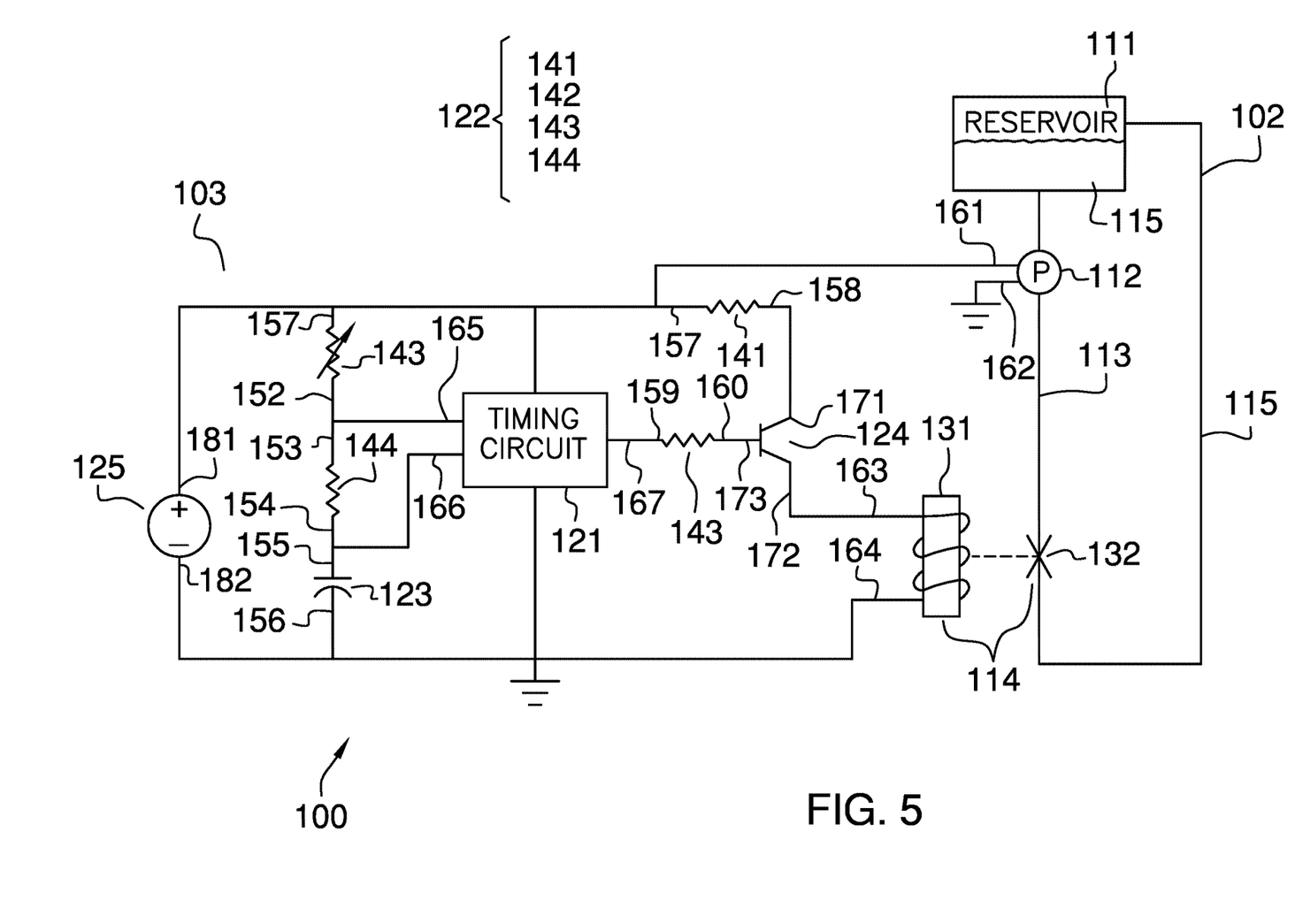
FIG. 5 is a schematic view of an embodiment of the disclosure.

Detailed reference will now be made to one or more potential embodiments of the disclosure, which are illustrated in FIGS. 1 through 5.

The cannulation training apparatus 100 (hereinafter invention) is a medical device. The invention 100 is configured for use in training a client to insert a cannula into the vein of a patient. The invention 100 simulates the arm of a patient such that the invention 100 receives the insertion of the cannula from the client. The invention 100 comprises a silicone housing 101, a fluidic circuit 102, and a timing device 103. The silicone housing 101 contains the fluidic circuit 102 and the timing device 103. The silicone housing 101 emulates an appendage of the patient. The fluidic circuit 102 emulates the flow of blood through the appendage of the patient. The timing device 103 controls the operation of a pump 112 that pumps fluid through the fluidic circuit 102 in a rhythmic fashion that emulates the pulse of a patient.

The silicone housing 101 is an elastomeric structure. The shape of the silicone housing 101 emulates an appendage of a patient. The silicone housing 101 receives the cannula during the training process. The modulus and viscosity of the silicone housing 101 are selected such that the silicone housing 101 emulates the feel of a patient's appendage when a cannula is inserted into the silicone housing 101 during training. The silicone housing 101 contains the fluidic circuit 102 and the timing device 103. In the first potential embodiment of the disclosure, the silicone housing 101 is molded from silicone.

The fluidic circuit 102 is a fluid transfer loop. The fluidic circuit 102 emulates the circulation of blood in a patient. The fluidic circuit 102 circulates a fluid through the silicone housing 101 that emulates the flow of blood through an appendage. The fluidic circuit 102 comprises a reservoir 111, a pump 112, a feed hose 113, a solenoid valve 114, and a circulation hose 115.

The reservoir 111 is a chamber contained within the silicone housing 101. The reservoir 111 stores the supply of acetone 116 that flows through the fluidic circuit 102. The reservoir 111 further comprises a stock of acetone 116.

The acetone 116 (CAS 67-14-1) is an organic chemical with the chemical formula C3H6O. The acetone 116 has a ketone functional group. The acetone 116 has a liquid phase at normal temperature and pressure. The applicant prefers the use of acetone 116 because the viscosity of acetone 116 closely matches the viscosity of blood at normal temperature and pressure.

The pump 112 is a mechanical device that generates a pressure differential which is used for transporting the fluid from reservoir 111 through the feed hose 113, the solenoid valve 114 and the circulation hose 115 back into the reservoir 111. In the first potential embodiment of the disclosure, the pump 112 is a self-regulating pump 112. By self-regulating is meant that the pump 112 will pump the acetone 116 out of the reservoir 111 into the feed hose 113 until a predetermined fluid cutoff pressure is reached within the feed hose 113. By controlling the setting of the predetermined fluid cutoff pressure of the pump 112, the pump 112 can simulate a variety of blood pressures within the fluidic circuit 102.

The feed hose 113 is a flexible tubular structure. The feed hose 113 is an elastomeric structure. The feed hose 113 forms a fluidic connection between the pump 112 and the solenoid valve 114. The circulation hose 115 is a flexible tubular structure. The circulation hose 115 is an elastomeric structure. The circulation hose 115 forms a fluidic connection between the solenoid valve 114 and the reservoir 111.

The solenoid valve 114 is an electrically controlled valve. The solenoid valve 114 controls the flow of acetone 116 through the fluidic circuit 102. The solenoid valve 114 comprises a coil 131 and a valve 132. The coil 131 is further defined with an eleventh lead 161 and a twelfth lead 162. The pump 112 is further defined with a thirteenth lead 163 and a fourteenth lead 164.

The coil 131 is a solenoid that is operated by the timing device 103. The coil 131 opens and closes the valve 132 in response to the rhythmic electrical signals generated by the timing device 103. The valve 132 is a fluidic control device that controls the flow of acetone 116 from the feed hose 113 into the circulation hose 115. The valve 132 is a well-known and documented mechanical device.

The timing device 103 controls the operation of the solenoid valve 114. The solenoid valve 114 opens and closes in response to the rhythmic electrical signals generated by the timing device 103 such that the acetone 116 flows through the fluidic circuit 102 as a series of rhythmic impulses. The rhythmic fluidic impulses generated by the solenoid valve 114 emulates the feel of a pulse within the silicone housing 101.

The timing device 103 is an electrical circuit. The timing device 103 provides the electrical power required to circulate a fluid that simulates blood through the fluidic circuit 102. The timing device 103 generates rhythmic electrical signals that control the fluid flow through the fluidic circuit 102. The rhythmic electrical signals generated by the timing device 103 simulate the pulse of a patient.

The timing device 103 comprises a timing circuit 121, a plurality of resistors 122, a capacitor 123, a transistor 124, and an external power source 125. The timing circuit 121 is further defined with a fifteenth lead 165, a sixteenth lead 166, and a seventeenth lead 167. The capacitor 123 is further defined with a fifth lead 155 and a sixth lead 156. The transistor 124 is further defined with a collector 171, an emitter 172, and a base 173. The external power source 125 is further defined with a positive terminal 181 and a negative terminal 182.

The timing circuit 121 is an electrical circuit. The timing circuit 121 generates the rhythmic electrical signals that control the fluid flow through the fluidic circuit 102. Specifically, the rhythmic electrical signals generated by the timing circuit 121 are used to energize and de-energize the coil 131 of the solenoid valve 114 which in turn opens and closes the valve 132 of the solenoid valve 114. In the first potential embodiment of the disclosure, the timing circuit 121 is based on a well-known and documented "555" integrated circuit. The timing circuit 121 is defined in greater detail elsewhere in this disclosure.

The fifteenth lead 165 in a first input lead of the timing circuit 121. The sixteenth lead 166 in a second input lead of the timing circuit 121. The voltage difference between the fifteenth lead 165 and the sixteenth lead 166 determines the duration between the rhythmic electrical signals generated by the timing circuit 121. The fifteenth lead 165 and the sixteenth lead 166 measure the voltage across the load resistor 144. The seventeenth lead 167 is the lead of the timing circuit 121 that presents the rhythmic electrical signals to the transistor 124.

Each of the plurality of resistors 122 is a well-known and documented circuit component. Each of the plurality of resistors 122 performs a function within the timing device 102 selected from the group consisting of: a) limiting the flow of electric current through the timing device 103; and, b) presenting a voltage to the timing circuit 121 that is used by the timing circuit 121 to determine the duration of the rhythmic pulses of generated by the timing circuit 121.

The plurality of resistors 122 comprises a first limit resistor 141, a second limit resistor 142, a trimming potentiometer 143, and a load resistor 144. The trimming potentiometer 143 is further defined with a first lead 151 and a second lead 152. The load resistor 144 is further defined with a third lead 153 and a fourth lead 154. The first limit resistor 141 is further defined with a seventh lead 157 and an eighth lead 158. The second limit resistor 142 is further defined with a ninth lead 159 and a tenth lead 160.

The first limit resistor 141 is a limit resistor. The first limit resistor 141 limits the electric current flowing from the external power source 125 into the transistor 124 and the coil 131 of the solenoid valve 114. The second limit resistor 142 is a limit resistor. The second limit resistor 142 limits the electric current flowing from the timing circuit 121 into the base 173 of the transistor 124.

The trimming potentiometer 143 is an electrical resistance device that presents an adjustable resistance to an electrical circuit. The trimming potentiometer 143 electrically connects to the load resistor 144 and the capacitor 123 to form a series circuit called a voltage divider. The adjustment of the trimming potentiometer 143 adjusts the duration between the rhythmic electrical signals generated by the timing circuit 121. The load resistor 144 is the element of the voltage divider that presents a voltage to the timing circuit 121. The voltage presented by the load resistor 144 to the timing circuit 121 determines the duration between the rhythmic electrical signals generated by the timing circuit 121.

The capacitor 123 is a well-known and documented circuit component. The capacitor 123 is an electric charge storage device. The capacitor 123 is used in conjunction with two resistors selected from the plurality of resistors 122 to present to the timing circuit 121 the voltage used to determine the duration of the rhythmic electrical signals generated by the timing circuit 121.

The transistor 124 is a three-terminal semiconducting device. The transistor 124 controls the flow of energy from the external power source 125 into the coil 131 of the solenoid valve 114. The timing circuit 121 controls the operation of the transistor 124. The transistor 124 operates like a switch. When a voltage is applied to the base 173, current will flow into the base 173 causing the transistor 124 to act like a closed switch allowing current to flow from the collector 171 to the emitter 172. When the voltage is removed from the base 173, the transistor 124 will act like an open switch disrupting current flow from the collector 171 to the emitter 172.

The external power source 125 is an externally provisioned source of electrical energy. The external power source 125 provides the electrical power required to operate the fluidic circuit 102 and the timing device 103.

The following five paragraphs describe the assembly of the invention 100. The pump 112 forms a fluidic connection between the reservoir 111 and the feed hose 113. The feed hose 113 forms a fluidic connection between the pump 112 and the valve of the solenoid valve 114. The valve 132 of the solenoid valve 114 forms a fluidic connection between the feed hose 113 and the circulation hose 115. The circulation hose 115 forms a fluidic connection between the valve 132 and the reservoir 111.

The positive terminal 181 of the external power source 125 electrically connects to the first lead 151 of the trimming potentiometer 143. The positive terminal 181 of the external power source 125 electrically connects to the seventh lead 157 of the first limit resistor 141. The positive terminal 181 of the external power source 125 electrically connects to the eleventh lead 161 of the pump 112. The positive terminal 181 of the external power source 125 electrically connects to the power input of the timing circuit 121.

The second lead 152 of the trimming potentiometer 143 electrically connects to the third lead 153 of the load resistor 144. The fifteenth lead 165 of the timing circuit 121 electrically connects to the third lead 153 of the load resistor 144. The fourth lead 154 of the load resistor 144 electrically connects to the fifth lead 155 of the capacitor 123. The sixteenth lead 166 of the timing circuit 121 electrically connects to the fifth lead 155 of the capacitor 123. The eighth lead 158 of the first limit resistor 141 electrically connects to the collector 171 of the transistor 124. The seventeenth lead 167 of the timing circuit 121 electrically connects to the ninth lead 159 of the trimming potentiometer 143.

The tenth lead 160 of the trimming potentiometer 143 electrically connects to the base 173 of the transistor 124. The emitter 172 of the transistor 124 electrically connects to the thirteenth lead 163 of the coil 131.

The negative terminal 182 of the external power source 125 electrically connects to the third lead 153 of the capacitor 123. The negative terminal 182 of the external power source 125 electrically connects to the fourteenth lead 164 of the coil 131. The negative terminal 182 of the external power source 125 electrically connects to the twelfth lead 162 of the pump 112. The negative terminal 182 of the external power source 125 electrically connects to the ground input of the timing circuit 121.

The following definitions were used in this disclosure:

Acetone: As used in this disclosure, acetone is a commonly used name that refers to 2-propanone (CAS 67-44-1). The chemical formula for 2-propanone is $C_3H_6O$.

Appendage: As used in this disclosure, appendage is a generic term used to describe either the arm and/or leg of a patient.

Cannula: As used in this disclosure, a cannula is a hollow tube that inserts into an object of the purpose of transferring fluids into and out of the object.

Capacitor: As used in this disclosure, a capacitor is an electrical device that is used to store an electric charge.

Client: As used in this disclosure, a client is an individual who is designated to receive the services of the disclosure at bar.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

External Power Source: As used in this disclosure, an external power source is a source of the energy that is externally provided to enable the operation of the present disclosure. Examples of external power sources include, but are not limited to, electrical power sources and compressed air sources.

Extremity: As used in this disclosure, extremity is a generic term used to describe either the hand and/or foot of a person. The extremity is located and the distal end of an appendage.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connection are well-known and documented in the mechanical, chemical, and plumbing arts.

Functional Group: As used in this disclosure, a functional group is specific chemical structure that 1) defines the structure of a chemical family; and, 2) determines the properties of the chemical family. Common functional groups include, but are not limited to, aldehydes, alkanes, alkenes, alkynes, alcohols, amides, amines, carboxylic acids, esters, ethers, haloalkanes, haloalkenes, haloalkynes, and ketones. As a practical matter, the intention of this definition is to use the term functional group in the same manner as the term is commonly used in organic chemistry.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Ketone: As used in this disclosure, a ketone is a functional group with the general chemical formula R1-(C=O)—R2. R1 and R2 are taken to be organic molecules attached to the C=O structure by carbon-carbon covalent bonds.

Lead: As used in this disclosure, a lead is a conductor that is physically used to electrically connect an electrical component into a larger circuit assembly.

Limit Resistor: As used in this disclosure, a limit resistor is an electrical resistor that is used to limit the flow of electric current through an electrical circuit.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Resistor: As used in this disclosure, a load resistor is an electrical resistor that is used to present a voltage to an electrical device. The presented voltage is controlled by controlling the amount of electrical current passing through the load resistor.

Modulus: As used in this disclosure, the modulus of an elastomeric material is a function that describes the percentage change in the span of the elastomeric material as a function of the force applied to the elastomeric material. When comparing modulus, a larger modulus is taken to imply that an increase in force is required to get the same percentage change in the elastomeric material.

Mold: As used in this disclosure, a mold is a container with a specific shape into which a liquid is contained. After the liquid cools to a solid phase, the solid phase of the liquid maintains the shape of the mold after removal. When used as a verb, to mold means to use a mold to create the shape of the solid. Polymer materials are often shaped using a mold.

Normal Temperature and Pressure: As used in this disclosure, normal temperature and pressure refers to atmospheric conditions corresponding to 20 degrees C. at 100 kPa (approx. 1 atmosphere). Normal temperature and pressure is often abbreviated as NTP.

Organic: As used in this disclosure, organic refers to a carbon-based chemical structure. A limited number of (mostly) carbon-based salts are traditionally considered inorganic chemical structures and are excluded from the study of organic chemistry.

Patient: As used in this disclosure, a patient is a person who is designated to receive a medical treatment, therapy or service. The term patient may be extended to an animal when used within the context of the animal receiving veterinary treatment or services.

Phase: As used in this disclosure, phase refers to the state of the form of matter. The common states of matter are solid, liquid, gas, and plasma.

Potentiometer: As used in this disclosure, a potentiometer is an adjustable electrical device that presents a resistance to a voltage. The level of resistance is adjustable.

Pulse: As used in this disclosure, a pulse is a rhythmic signal or stimulus wherein the signal or stimulus has a brief duration.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Relaxed Shape: As used in this disclosure, a structure is considered to be in its relaxed state when no shear, strain, or torsional forces are being applied to the structure.

Reservoir: As used in this disclosure, a reservoir refers to a container or containment system that is configured to store a liquid.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Rhythm: As used in this disclosure, a rhythm refers to a pattern that repeats at regular intervals.

Silicone: As used in this disclosure, silicone is a substance formed from silicon (Si) and oxygen (O) that forms the backbone of polymer type chains similar to polymers that are formed by carbon. Though exceptions do exist, silicone is generally considered to be less reactive and to have better heat resistance when compared to most common carbon-based polymers.

Solenoid: As used in this disclosure, a solenoid is a cylindrical coil of electrical wire that generates a magnetic field that can be used to mechanically move a shaft made of a magnetic core.

Solenoid Valve: As used in this disclosure, a solenoid valve is an electromechanically controlled valve that is used to control fluid or gas flow. A two-port solenoid valve opens or closes to fluid flow through the valve portion of the solenoid valve. A three-port solenoid valve switched fluid or gas flow between a first port and a second port to either feed or be fed from a third port.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Timing Device: As used in this disclosure, a timing device is an automatic mechanism for activating or deactivating a device at a specific time or after a specific period of time. This disclosure assumes that the logic module is provisioned with a timing circuit that can be used as a timing device. A timing device that activates an audible alarm is often referred to as a timer.

Transistor: As used in this disclosure, a transistor is a general term for a three-terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Valve: As used in this disclosure, a valve is a device that is used to control the flow of a fluid (gas or liquid) through a pipe, tube, or hose.

Viscosity: As used in this disclosure, viscosity refers to the resistance of a liquid or an elastic material to deformation. Higher viscosity would refer to a greater resistance to flow or to deformation.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A cannulation training apparatus comprising:
a silicone housing, a fluidic circuit, and a timing device;
wherein the silicone housing contains the fluidic circuit and the timing device;
wherein the cannulation training apparatus is a medical device;
wherein the cannulation training apparatus is configured for use in simulating the insertion of a cannula;
wherein the silicone housing emulates an appendage;
wherein the fluidic circuit emulates the flow of blood through the appendage;
wherein the timing device controls the fluid flow through the fluidic circuit;
wherein the timing device generates a rhythmic pattern;
wherein the timing device comprises a timing circuit, a plurality of resistors, a capacitor, a transistor, and an external power source;
wherein the timing circuit, the plurality of resistors, the capacitor, the transistor, and the external power source are electrically interconnected;
wherein the timing circuit is further defined with a first lead, a second lead, and a third lead;
wherein the capacitor is further defined with a fourth lead and a fifth lead;
wherein the transistor is further defined with a collector, an emitter, and a base;
wherein the external power source is further defined with a positive terminal and a negative terminal.

2. The cannulation training apparatus according to claim 1
wherein the silicone housing is an elastomeric structure;
wherein the shape of the silicone housing emulates an appendage;
wherein the silicone housing receives the cannula.

3. The cannulation training apparatus according to claim 2
wherein the fluidic circuit is a fluid transfer loop;
wherein the fluidic circuit circulates a fluid through the silicone housing that emulates the flow of blood through an appendage.

4. The cannulation training apparatus according to claim 3
wherein the timing device is an electrical circuit;
wherein the timing device provides the electrical power required to circulate the fluid through the fluidic circuit;
wherein the timing device generates rhythmic electrical signals that control the fluid flow through the fluidic circuit;
wherein the rhythmic electrical signals generated by the timing device simulate a pulse.

5. The cannulation training apparatus according to claim 4 wherein a viscosity of the silicone housing are selected such that the insertion of the cannula into the silicone housing emulates clinical conditions.

6. The cannulation training apparatus according to claim 5
wherein the fluidic circuit comprises a reservoir, a pump, a feed hose, a solenoid valve, and a circulation hose;
wherein the reservoir, the pump, the feed hose, the solenoid valve, and the circulation hose form a loop through which the fluid flows;
wherein the solenoid valve controls the fluid flow through the fluidic circuit;
wherein the pump generates a pressure differential to transport the fluid through the fluidic circuit.

7. The cannulation training apparatus according to claim 6
wherein the reservoir is a chamber contained within the silicone housing;
wherein the reservoir further comprises a stock of acetone (CAS 67-14-1);
wherein the reservoir stores the stock of acetone;
wherein the acetone is the fluid that flows through the fluidic circuit;
wherein the acetone is an organic chemical with the chemical formula C3H6O.

8. The cannulation training apparatus according to claim 7
wherein the pump is a mechanical device that generates the pressure differential;
wherein the pump transports the acetone from reservoir through the feed hose, the solenoid valve and the circulation hose back into the reservoir.

9. The cannulation training apparatus according to claim 8
wherein the pump is a self-regulating pump;
wherein by self-regulating is meant that the pump will pump the acetone out of the reservoir into the feed hose until a predetermined fluid cutoff pressure is reached within the feed hose.

10. The cannulation training apparatus according to claim
wherein the feed hose is a flexible tubular structure;
wherein the feed hose is an elastomeric structure;
wherein the feed hose forms a fluidic connection between the pump and the solenoid valve.

11. The cannulation training apparatus according to claim 10
wherein the circulation hose is a flexible tubular structure;
wherein the circulation hose is an elastomeric structure;
wherein the circulation hose forms a fluidic connection between the solenoid valve and the reservoir.

12. The cannulation training apparatus according to claim 11 wherein the solenoid valve is an electrically controlled valve.

13. The cannulation training apparatus according to claim 12
wherein the solenoid valve comprises a coil and a valve;
wherein the coil is a solenoid that is operated by the timing device;
wherein the coil opens and closes the valve;
wherein the coil is further defined with a sixth lead and a seventh lead;
wherein the valve is a fluidic control device that controls the flow of acetone from the feed hose into the circulation hose.

14. The cannulation training apparatus according to claim 13
wherein the timing device controls the operation of the solenoid valve;
wherein the solenoid valve opens and closes in response to the rhythmic electrical signals generated by the timing device such that the acetone flows through the fluidic circuit as a series of rhythmic impulses.

15. The cannulation training apparatus according to claim 14
wherein the timing circuit generates the rhythmic electrical signals used to energize and de-energize the coil of the solenoid valve;
wherein the first lead in a first input lead of the timing circuit;
wherein the second lead in a second input lead of the timing circuit;
wherein the voltage difference between the first lead and the second lead determines the duration between the rhythmic electrical signals generated by the timing circuit;
wherein the first lead and the second lead measure the voltage across the load resistor;
wherein the third lead is the lead of the timing circuit that presents the rhythmic electrical signals to the transistor.

16. The cannulation training apparatus according to claim 15
wherein the plurality of resistors comprises a first limit resistor, a second limit resistor, a trimming potentiometer, and a load resistor;
wherein the first limit resistor is a limit resistor;
wherein the first limit resistor limits the electric current flowing from the external power source into the transistor and the coil of the solenoid valve;
wherein the second limit resistor is a limit resistor;
wherein the second limit resistor limits the electric current flowing from the timing circuit into the base of the transistor;
wherein the trimming potentiometer is an electrical resistance device that presents an adjustable resistance to an electrical circuit;
wherein the trimming potentiometer electrically connects to the load resistor and the capacitor to form a series circuit called a voltage divider;
wherein the adjustment of the trimming potentiometer adjusts the duration between the rhythmic electrical signals generated by the timing circuit;
wherein the load resistor is the element of the voltage divider that presents a voltage to the timing circuit;
wherein the voltage presented by the load resistor to the timing circuit determines the duration between the rhythmic electrical signals generated by the timing circuit;
wherein the capacitor is a circuit component;
wherein the capacitor is an electric charge storage device;
wherein the trimming potentiometer is further defined with an eighth lead and a ninth lead;
wherein the load resistor is further defined with a tenth lead and an eleventh lead;
wherein the first limit resistor is further defined with a twelfth lead and a thirteenth lead;
wherein the second limit resistor is further defined with a fourteenth lead and a fifteenth lead;
wherein the transistor is a three-terminal semiconducting device;
wherein the transistor controls the flow of energy from the external power source into the coil of the solenoid valve;
wherein the timing circuit controls the operation of the transistor;
wherein the transistor operates like a switch;
wherein when a voltage is applied to the base, current will flow into the base causing the transistor to act like a closed switch allowing current to flow from the collector to the emitter;
wherein when the voltage is removed from the base, the transistor will act like an open switch disrupting current flow from the collector to the emitter;
wherein the external power source is an externally provisioned source of electrical energy;
wherein the external power source provides the electrical power required to operate the fluidic circuit and the timing device.

17. The cannulation training apparatus according to claim 16
wherein the pump forms a fluidic connection between the reservoir and the feed hose;
wherein the feed hose forms a fluidic connection between the pump and the valve of the solenoid valve;
wherein the valve of the solenoid valve forms a fluidic connection between the feed hose and the circulation hose;
wherein the circulation hose forms a fluidic connection between the valve and the reservoir.

18. The cannulation training apparatus according to claim 17
wherein the positive terminal of the external power source electrically connects to the eighth lead of the trimming potentiometer;
wherein the positive terminal of the external power source electrically connects to the twelfth lead of the first limit resistor;
wherein the positive terminal of the external power source electrically connects to the sixth lead of the pump;
wherein the positive terminal of the external power source electrically connects to the power input of the timing circuit;
wherein the ninth lead of the trimming potentiometer electrically connects to the tenth lead of the load resistor;
wherein the first lead of the timing circuit electrically connects to the tenth lead of the load resistor;
wherein the eleventh lead of the load resistor electrically connects to the fourth lead of the capacitor;
wherein the second lead of the timing circuit electrically connects to the fourth lead of the capacitor;
wherein the thirteenth lead of the first limit resistor electrically connects to the collector of the transistor;

wherein the third lead of the timing circuit electrically connects to the fourteenth lead of the trimming potentiometer;

wherein the fifteenth lead of the trimming potentiometer electrically connects to the base of the transistor;

wherein the negative terminal of the external power source electrically connects to the tenth lead of the capacitor;

wherein the negative terminal of the external power source electrically connects to the seventh lead of the pump;

wherein the negative terminal of the external power source electrically connects to the ground input of the timing circuit.

19. The cannulation training apparatus according to claim 18 wherein the silicone housing is molded from silicone.

* * * * *